(12) United States Patent
Gates et al.

(10) Patent No.: US 6,626,339 B2
(45) Date of Patent: Sep. 30, 2003

(54) HOLDER MOUNTED BAG

(75) Inventors: George D. Gates, So. Jordan, UT (US); Travis D. Gates, Riverton, UT (US)

(73) Assignee: All Rite Products, West Jordan, UT (US)

( * ) Notice: Subject to any disclaimer, the term of this patent is extended or adjusted under 35 U.S.C. 154(b) by 0 days.

(21) Appl. No.: 09/892,672

(22) Filed: Jun. 27, 2001

(65) Prior Publication Data

US 2003/0000981 A1 Jan. 2, 2003

(51) Int. Cl.⁷ .................................................. B60R 7/00
(52) U.S. Cl. ........................ 224/401; 224/420; 224/913; 42/96; 150/154; 206/315.11
(58) Field of Search ................................. 224/401, 420, 224/913, 150, 577, 585; 206/315.11, 317; 150/154, 166, 167; 42/96

(56) References Cited

U.S. PATENT DOCUMENTS

| 2,364,340 A | * | 12/1944 | Bogg, Jr. ..................... 42/106 |
| 3,701,371 A | * | 10/1972 | Stackhouse ................. 206/317 |
| 3,968,913 A | * | 7/1976 | Weed et al. ................. 150/166 |
| 4,249,687 A | * | 2/1981 | Warnier ....................... 224/613 |
| 4,607,772 A | | 8/1986 | Hancock |
| 4,756,456 A | * | 7/1988 | Schauer ...................... 206/317 |
| 5,078,279 A | | 1/1992 | Hancock et al. |
| 5,476,188 A | | 12/1995 | Hassenpflug |
| 5,586,345 A | * | 12/1996 | Nielsen et al. .............. 150/154 |
| 5,678,344 A | * | 10/1997 | Jones et al. ..................... 42/96 |
| 5,706,990 A | | 1/1998 | Lahrson |
| 5,878,929 A | | 3/1999 | Leonard |
| 6,021,936 A | | 2/2000 | Savant |
| 6,119,388 A | * | 9/2000 | Jones et al. ..................... 42/96 |
| 6,145,719 A | | 11/2000 | Robert |
| 6,199,734 B1 | * | 3/2001 | Meeks ......................... 224/401 |
| 6,256,922 B1 | * | 7/2001 | Jones et al. ..................... 42/96 |

* cited by examiner

Primary Examiner—Stephen K. Cronin
(74) Attorney, Agent, or Firm—Thorpe, North & Western, LLP

(57) ABSTRACT

A holder mounted bag, comprising a flexible case configured to enclose an object and a portion of a holder upon which the object is disposed, and configured to be opened to allow access to the object while the case remains attached to the holder. The bag includes an object opening sized to receive the object therethrough, and at least one holder opening sized to receive a portion of the holder therethrough.

22 Claims, 2 Drawing Sheets

HOLDER MOUNTED BAG

BACKGROUND OF THE INVENTION

1. Field of the Invention

The present invention relates generally to protective covers for guns and the like. More particularly, the present invention relates to a bag which is configured to cover and enclose both an object disposed upon a rack, and a portion of the rack.

2. Related Art

There are many carrying devices which attach to cars, trucks, ATV's, or other structures, for holding elongate objects. These range from simple gun racks, to more elaborate holding systems. U.S. Pat. Nos. 4,607,772 and 5,078,279 disclose utility carrying devices for carrying guns, fishing poles, and the like, which are mountable to the handlebars, cargo rack, frame, or other parts of a car, truck, motorcycle, or ATV, or to a wall, window, etc.

When a gun or other object is placed in such holders, especially when the holder is mounted on an ATV or other vehicle, it is often desirable to protect the elongate object with a cover or case of some kind. While cases and covers for protecting guns, fishing poles, and other objects are well known, merely placing the object in the holder while in its cover or case presents certain problems. When a user stores a gun, for example, in a conventional gun bag or case on an ATV gun rack, and access to the gun is desired, the user must typically remove both the gun and gun bag from the rack, set the bag upon the ground or some other surface, open the bag, and remove the gun. Removing the gun bag from the rack in order to gain access to the gun is very inconvenient, and promotes wear and dirtying of the bag. Additionally, the gripping portion of the rack will tend to rub against and wear the outer surface of the bag, thus shortening its life.

SUMMARY OF THE INVENTION

It has been recognized that it would be advantageous to develop a bag which encloses an object on a holder or rack, and which may be opened without removing the object or the bag from the holder.

It has also been recognized that it would be desirable to develop a bag which is attached to a holder, and which, when opened, may be folded into a compact shape and disposed out of the way, without being removed from the holder.

The present invention advantageously provides a bag that is mounted to a rack or holder for holding an object. The bag includes a flexible case configured to enclose both the object and a portion of the holder upon which the object is disposed. Advantageously, the bag is configured to be opened to allow access to the object while the case remains attached to the holder. The bag includes an object opening sized to receive the object therethrough, and at least one holder opening sized to receive a portion of the holder therethrough.

In accordance with a more detailed aspect of the present invention, a transport system is provided, including a holder configured to be mounted on a vehicle, and a bag attached to the holder. The bag is configured to enclose both a portion of the holder, and an object disposed thereon. The bag includes two flexible sides hingedly joined along a lower edge, and releasably joined along the remaining edges. The bag is moveable between a closed configuration wherein the object and a portion of the holder are enclosed, and an open configuration wherein a user may have access to the object while the case remains attached to the holder.

In accordance with another more detailed aspect of the present invention, when in the open position, the ends of the bag may be folded inwardly beneath a lower edge of the open bag, such that the ends of the bag are enclosed and held between the attached sides between the upright posts of the holder.

Additional features and advantages of the invention will be apparent from the detailed description which follows, taken in conjunction with the accompanying drawings, which together illustrate, by way of example, features of the invention.

DETAILED DESCRIPTION

Figure 1:
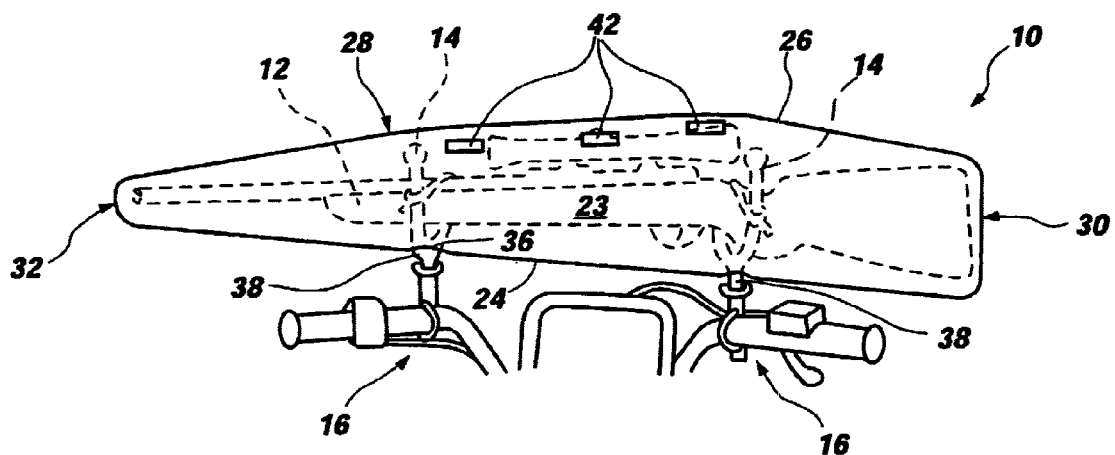
FIG. 1 is a front view of one embodiment of a holder mounted bag in accordance with the present invention, configured for enclosing a gun.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 2:
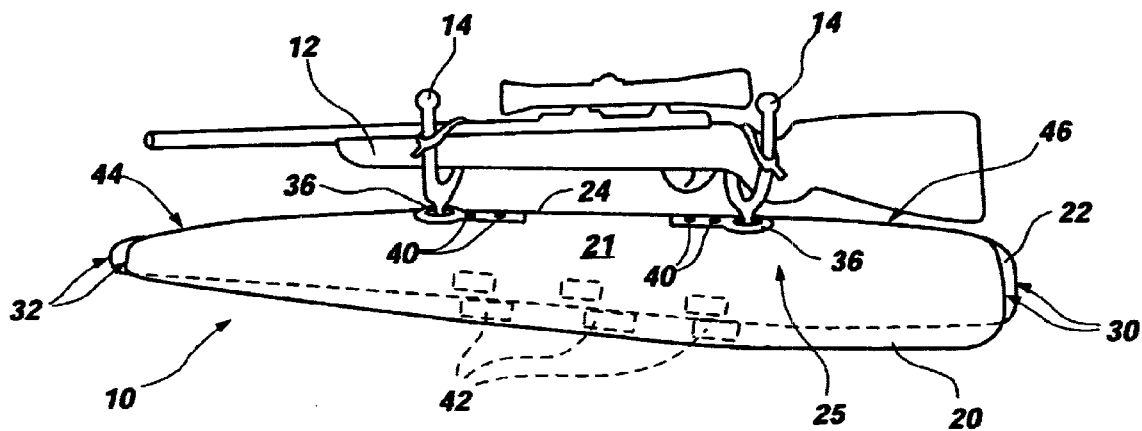
FIG. 2 is a front view of the holder mounted gun bag of FIG. 1, with the bag open.
Figure 4:
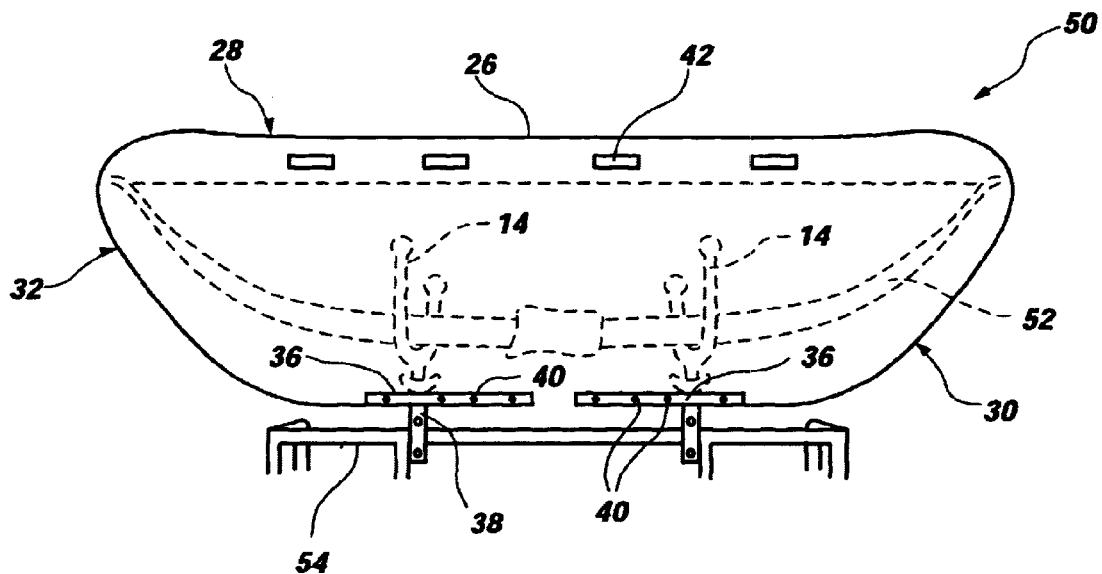
FIG. 4 is a front view of an alternative embodiment of a holder mounted bag in accordance with the present invention, configured for enclosing a bow.

Referring to FIGS. 1 and 2, the invention generally comprises a bag 10 which is configured to cover and contain both (1) an associated object, such as a gun 12, and (2) a portion of the holder/rack/supports 14 upon which the object is stored. It is especially adapted for use with ATV-mounted carrier racks, and in FIG. 1 is shown mounted upon the handlebars 16 of an ATV or similar vehicle. Alternatively, as shown in FIG. 4, the rack 14 (and thus the bag) may be mounted upon an elongate rail 54 or other comparable structure, such as a treestand handrail, a portion of a cargo rack, etc. The invention thus provides a bag/cover/case which encloses both the object and a portion of the object rack/support/holder. Such racks allow the holding of objects which may not easily fit onto or be securable upon a cargo rack or the like. Advantageously, the bag can be opened to provide access to the object, while staying in place upon the holder, without having to be removed to be opened.

Figure 3:
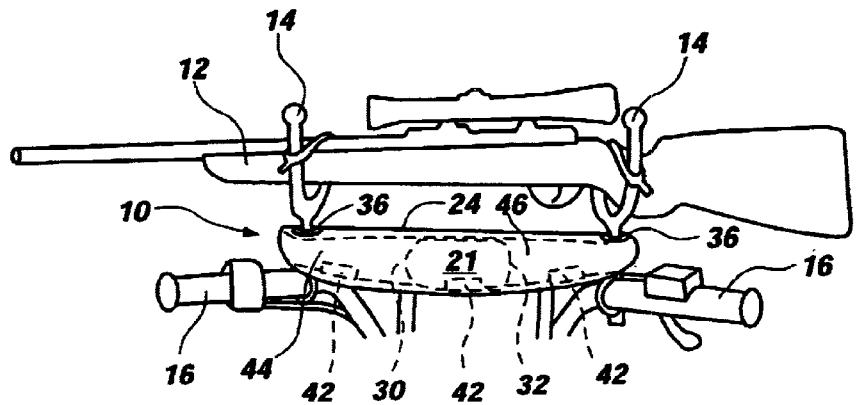
FIG. 3 is a front view of the gun bag of FIG. 2 with the ends of the bag folded inwardly and enclosed between the sides of the bag beneath the rack.

It will be apparent that the size, shape, and configuration of the bag may be selected to correspond to a variety of objects, as desired. As shown in FIGS. 1–3, the bag may be configured to cover and protect a rifle 12 disposed on the rack 14. Alternatively, referring to FIG. 4, a differently shaped bag 50 may be configured for enclosing a bow 52. It will be apparent that the bag may be configured to accommodate other elongate objects also, such as a fishing pole (not shown), a shovel (not shown), etc. It will be apparent that such elongate objects may require more than one upright support 14.

Figure 5:
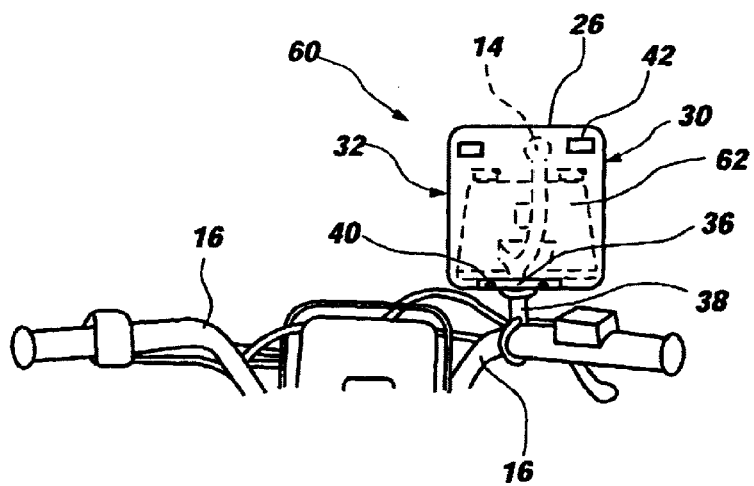
FIG. 5 is a front view of an alternative embodiment of a holder mounted bag in accordance with the present invention, configured for enclosing binoculars.

Alternatively, referring to FIG. 5, a differently shaped bag 60 may be configured for enclosing a small object, such as binoculars 62, which requires only one upright support or holder 14. Other embodiments may be devised for use with other objects of varying sizes and shapes, such as a handgun (not shown), a tackle box (not shown), coats (not shown), a small cooler (not shown), odd-shaped tools such as a chainsaw (not shown), a leaf blower (not shown), etc.

Returning to FIGS. 1–2, the holder mounted bag 10 generally comprises a flexible bag or case having a first side 20 and a second side 22, which are hingedly or flexibly connected along a lower edge 24. The bag may be a relatively flexible durable fabric (e.g. canvas, nylon, etc), and is preferably waterproof. The first and second sides each have an interior face 21 and an exterior face 23. The interior faces may include a soft interior material, such as felt or other soft fabric, for protecting the object from damage. The bags 50 and 60 of FIGS. 4 and 5 are configured similarly.

The flexible bag 10 also has a closure device 26, such as a zipper, snaps, hook and loop fasteners (i.e. velcro), or other similarly useful mechanism, disposed at least along a portion of an upper edge 28 of the bag, and possibly also along two side edges 30 and 32. The closure device allows the first and second sides 20 and 22 of the bag to be releasably joined, in order to form an object opening 25.

In the case of a gun 12, for example, the object opening 25 may extend along the entirety of the upper edge 28, along the side edges 30 and 32, and perhaps also a portion of the lower edge 24, as shown in FIG. 2, allowing the entire case to be laid open. The same may be true for other embodiments, such as the bag 50 shown in FIG. 4. However, in other embodiments, such as that shown in FIG. 5, the bag 60 may include an object opening which extends along just the top edge 26, or, alternatively, along the top edge and some or all of the side edges 30 and 32.

Returning to FIGS. 1–2, the lower edge 24 includes one or more holder openings 36 for allowing the rack supports 38 to extend into the interior of the bag when it is closed. These holder openings 36 may be large in size to accommodate a wide variety of sizes and types of racks which may extend therethrough, and may be provided with a zipper, snaps, buttons, velcro, or other attachment device 40 which allows the holder openings 36 to be partially closed over the rack supports 38 when in place, to minimize the size of the opening(s) and to more securely attach the bag to the holder.

This invention provides several desirable features and advantages. To gain access to the object, a user simply opens the object opening 25 by disconnecting the closure device 26 to separate the upper edge 28 (and possibly also the side edges 30 and 32) of the bag, and removes the object from the rack 14. If the side edges 30 and 32 are also opened, the sides 20 and 22 of the bag will drop or rotate down and away from the object 12, as shown in FIG. 2, exposing the interior faces 21. In the open position, the object is conveniently accessible upon the rack 14. Advantageously, the object is directly held by the object holder, as designed. However, because the sides of the bag are flexibly connected by the lower edge 24, they remain attached to the rack, and in position to again be folded up to encase the object.

When the sides of the bag are again folded up around the object, the bag may be closed along the upper edge 28 and side edges 30 and 32, as shown in FIG. 1. In this position the object is protected from rain and damage from surroundings, and the bag or case is not exposed to excessive wear, dirt, or other unnecessarily damaging conditions. Additionally, because the bag encloses the object and is attached to the holder or rack, it provides additional security by helping to hold the object on the rack. For example, if the object were to be jarred loose in the holder, such as when attached to a moving ATV, the bag itself would provide an additional measure of safety to prevent the object from entirely coming off of the holder and the vehicle. Likewise, the bag can help to secure an object which may not fit securely in the rack alone.

Disposed on the outer sides of the bag, near the upper edge 28, are fasteners 42, such as velcro, snaps, buttons, a zipper, etc., which are provided to allow the outer faces 23 of the sides 20 and 22 of the bag to be attached to each other when the bag is opened and downwardly folded together. Referring to FIG. 3, when the bag is open and the sides have dropped downward to expose the object or other elongate item, the ends of the bag 44 and 46 (those portions extending from each support 38 to the nearest respective side edge 30 or 32) may be folded inwardly beneath the lower edge 24, and substantially between the supports 38. Alternatively, in the case of a bag in which the object opening extends only along the upper edge 26, the bag may be folded downward and inverted, placing the outer faces 23 of the sides 20 and 22 of the bag adjacent to each other. The fasteners 42 are then connected to each other below the lower edge, such that the ends 44 and 46 of the bag are enclosed and held between the attached sides below the holder. This folding feature advantageously allows the open bag to be folded into a compact shape which is out of the way, and thereby helps prevent the open bag from interfering with operation of the ATV, and also helps protect the bag from damage when opened.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A bag configured to mount upon a holder, comprising:
   a) a flexible case formed of a flexible material, configured to be attached to a holder, and to enclose both a portion of the holder and an object disposed thereupon;
   b) an object opening, formed in the case, and sized to receive the object therethrough, to allow access to the object while the case remains attached to the holder; and
   c) at least one holder opening, formed in the case and having:
      i) a first, larger configuration; and
      ii) a second, smaller configuration;
   d) the holder opening being sized to receive a portion of the holder therethrough when in the first, larger configuration, and configured to be fastenable into the second, smaller configuration about a section of the holder after receiving the holder therethrough.

2. The bag according to claim 1, further comprising a holder disposed within the holder opening and wherein the at least one holder opening further comprises an attachment device to partially close the holder opening over the portion of the holder.

3. The bag according to claim 1, further comprising an object disposed upon the holder, the object being selected from the group consisting of a gun, a bow, and binoculars.

4. The bag according to claim 1, wherein the holder opening further included an attachment device, coupled to at least one side of the holder opening, the attachment device being configured to fasten the holder opening in the second, smaller configuration about a section of the holder after receiving the holder therethrough.

5. The bag according to claim 1, wherein the flexible case further comprises:
   a first side, having an upper edge and a lower edge; and
   a second side, having an upper edge and a lower edge, hingedly connected to the first side along the lower edge, such that the first and second sides drop downward when the case is opened.

6. The bag according to claim 5, wherein the at least one holder opening is disposed within the lower edge of the first and second sides.

7. The bag according to claim 5, further comprising a closure device, attached to the upper edge of the first side and the upper edge of the second side, whereby the first and second sides may be selectively attached or detached to selectively open or close the object opening and thereby cover or uncover the object.

8. The bag according to claim 5, further comprising fasteners, disposed on outer surface of the first and second sides near the upper edges thereof, configured to attach the outer surfaces of the first and second sides to each other when the bag is opened and the sides are downwardly disposed.

9. The bag according to claim 8, further comprising ends which are inwardly foldable, so as to be disposable between the sides of the bag when said sides are downwardly disposed and attached by the fasteners.

10. A bag configured to be mounted on a holder having a pair of upright supports, comprising:
    a) first and second sides of flexible material, each having a lower edge and an upper edge, and being hingedly connected together along the lower edge;
    b) a pair of holder openings, disposed in the lower edge and having:
       i) a first, larger configuration;
       ii) a second, smaller configuration; and
       iii) an attachment device, coupled to at least one side of one of the holder openings, the attachment device being configured to fasten the holder opening in the second configuration about a section of the holder after receiving the holder therethrough; and
    c) each holder opening configured to allow a portion of a support to extend therethrough when in the first, larger configuration, and configured to be fastenable into the second, smaller configuration about a section of the holder after receiving the holder therethrough; and
    d) a closure device, disposed along the upper edges of the first and second sides, and configured to selectively attach the upper edges to allow selective closure of the bag around both an object and the portion of each of the object supports extending through the holder openings.

11. The bag according to claim 10, further comprising an attachment device, associated with the holder openings, configured to allow the holder openings to be partially closed over the respective portion of the object supports, to more securely attach the bag thereto.

12. The bag according to claim 10, further comprising:
    fasteners, disposed on an outer surface of the first and second sides near the upper edges thereof, configured to allow the outer surfaces of the first and second sides to be attached to each other when the bag is opened and the sides are downwardly disposed; and
    inwardly foldable ends, configured to be folded between the pair of upright object supports and enclosed between the sides of the bag when said sides are downwardly disposed and attached by the fasteners.

13. The bag according to claim 10, further comprising an object disposed upon the holder, the object being selected from the group consisting of a gun, a bow, and binoculars.

14. A transport system, comprising:
    a) a holder configured to be mounted on a vehicle; and
    b) a bag, attached to the holder, enclosing a portion of the holder, and configured to enclose an object disposed thereon, the bag including:
       i) two flexible sides having lower edges;
       ii) hingedly joined along at least the lower edges of the flexible sides;
       iii) releasably joined along remaining edges of the flexible sides; and
       iv) selectively moveable between:
          (1) a closed configuration, wherein the object and a portion of the holder are enclosed between the sides;
          (2) an open configuration, wherein the sides are rotated away from the object, while the case remains attached to the holder; and
    c) at least one holder opening, formed in the bag and having:
       i) a first, larger configuration; and
       ii) a second, smaller configuration;
    d) the holder opening being sized to receive a portion of the holder therethrough when in the first, larger configuration, and configured to be fastenable into the second, smaller configuration about a section of the holder after receiving the holder therethrough.

15. The transport system according to claim 14, further comprising a vehicle to which the holder is attached.

16. The transport system according to claim 14, further comprising:
    fasteners, disposed on an outer surface of the first and second sides near the upper edges thereof, configured to allow the outer surfaces of the first and second sides to be attached to each other when the bag is opened and the sides are downwardly disposed; and
    wherein ends of the bag disposed outward of the holder are inwardly foldable, so as to be disposable between the sides of the bag when said sides are downwardly disposed and attached by the fasteners.

17. The transport system according to claim 14, wherein the sides of the bag are releasably joinable by a closure device selected from the group consisting of a zipper, snaps, and hook and loop fasteners.

18. The transport system according to claim 14, further comprising:
    at least one holder opening, disposed within the lower edge, and receiving a portion of the holder therethrough; and
    an attachment device, associated with the at least one holder opening, configured to allow the at least one holder opening to be partially closed over the portion of the holder, to more securely affix the bag thereto.

19. The bag according to claim 14, further comprising an object disposed upon the holder, the object being selected from the group consisting of a gun, a bow, and binoculars.

20. The bag according to claim 14, wherein the holder opening further included an attachment device, coupled to at least one side of the holder opening, the attachment device being configured to fasten the holder opening in the second, smaller configuration about a section of the holder after receiving the holder therethrough.

21. A gun bag configured to mount upon a gun holder, comprising:
   a) a gun case formed of a flexible material, configured to be attached to a gun holder, and to enclose both a portion of the holder and a gun disposed thereupon;
   b) an opening, formed in the case, and sized to receive the gun therethrough, and configured to allow access to the gun while the case remains attached to the holder; and
   c) at least one holder opening, formed in the case and having:
      i) a first, larger configuration; and
      ii) a second, smaller configuration;
   d) the holder opening being sized to receive a portion of the holder therethrough when in the first, larger configuration, and configured to be fastenable into the second, smaller configuration about a section of the holder after receiving the holder therethrough.

22. The bag according to claim 21, wherein the holder opening further includes an attachment device, coupled to at least one side of the holder opening, the attachment device being configured to fasten the holder opening in the second, smaller configuration about a section of the holder after receiving the holder therethrough.

* * * * *